United States Patent [19]
Herz et al.

[11] Patent Number: 5,910,820
[45] Date of Patent: Jun. 8, 1999

[54] CORRECTION OF FLICKER ASSOCIATED WITH NONINTERLACED-TO-INTERLACED VIDEO CONVERSION

[75] Inventors: William S. Herz, Newark; Jon E. Graham, San Jose, both of Calif.

[73] Assignee: S3, Incorporated, Santa Clara, Calif.

[21] Appl. No.: 08/621,567

[22] Filed: Mar. 25, 1996

[51] Int. Cl.⁶ .............................. H04N 7/01; H04N 11/20
[52] U.S. Cl. ..................... 348/446; 348/447; 348/910
[58] Field of Search .................... 348/448, 458, 348/459, 441, 910, 446, 447, 606, 607, 625, 627, 628, 629, 630, 631; H04N 7/01, 5/21

[56] References Cited

U.S. PATENT DOCUMENTS

4,991,021  2/1991  Nikoh et al. ........................... 348/606
5,136,385  8/1992  Campbell ............................... 348/607

*Primary Examiner*—Michael Lee
*Attorney, Agent, or Firm*—Skjerven, Morrill, MacPherson, Franklin & Friel LLP

[57]  ABSTRACT

A method and apparatus for correcting the flicker artifact associated with noninterlaced to interlaced video conversion includes a Set-Interpolative-Threshold comparator function whereby weighted line averaging is used only if the difference in luminance, or other color component, of vertically adjacent pixels in the noninterlaced video exceeds a user set threshold value. When the differential value in luminance, or other color component, is greater than the threshold value, and such line averaging is used, the negative effects of the line averaging, such as blurring and darkening of the resulting video frame, are at least partially corrected by aperture/inverse aperture correction.

10 Claims, 8 Drawing Sheets

FIG. 9

CORRECTION OF FLICKER ASSOCIATED WITH NONINTERLACED-TO-INTERLACED VIDEO CONVERSION

BACKGROUND OF THE INVENTION

1. Field of the Invention

This invention relates to the conversion of noninterlaced video into an interlaced video format, and more particularly removing the flicker artifact resulting from noninterlaced video being encoded into interlaced video such as NTSC, PAL, SECAM, HDTV, or Super NTSC.

2. Related Art

While early computers relied on television set monitors to display computer graphics, television and computer graphics have since evolved differently. For instance, computer graphics are typically displayed in a noninterlaced format with a vertical frame refresh rate (frame rate) of 60–80 hertz (Hz), and encoded in the "Red-Green-Blue" (RGB) color space.

In contrast, standard video, such as used by televisions and VCRs, is interlaced video with a vertical frame refresh rate (frame rate) of 30 Hz (NTSC) or 25 Hz (PAL and SECAM), and is encoded in the YUV (PAL), the YIQ (NTSC), the YPrPb (HDTV), or the YCrCb color space.

The differences in standard video and computer graphics video did not present significant problems until the evolution of the "multi-media" environment where it is desirable to display both forms of video on the same television monitor. In order to display computer graphics on a television monitor or record it on a VCR, the noninterlaced computer graphics video must be encoded (converted) into an interlaced standard video format.

An interlaced video format uses two interleaved fields to display one frame of video. Each field is a series of video scan lines each representing a raster sweep across a monitor by an electron gun or other display device. Each scan line is further divided into individual picture elements (pixels).

Each of the two fields contains half of the scan lines of one frame of video. One of the fields in the frame contains the even numbered scan lines while the other field contains the odd numbered scan lines. Each frame of video is essentially one picture or "still" out of the series of pictures or "stills" which make up a video stream.

A "frame rate" is how often the video source repaints or "refreshes" the screen with a new video frame. In the NTSC system, the screen is refreshed every thirtieth of a second or at a frame rate of 30 Hz. For PAL, the frame rate is 25 Hz.

Figure 1:
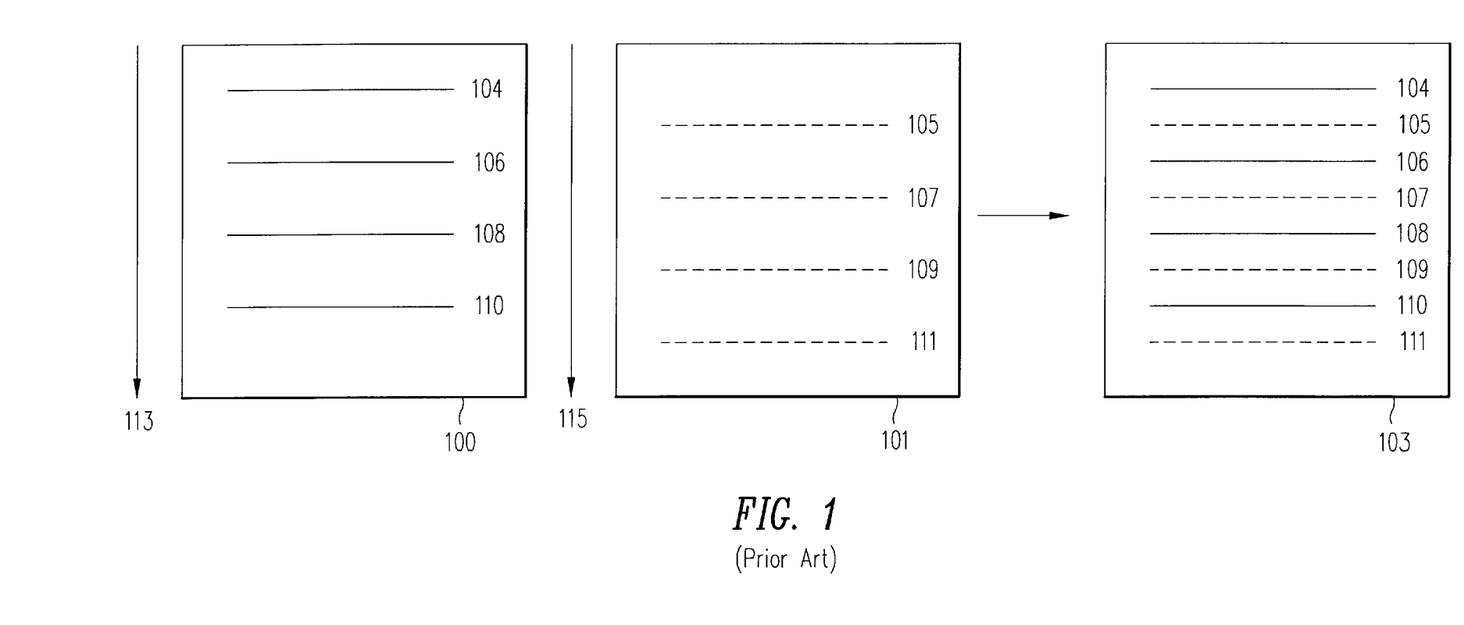
FIG. 1 shows an interlaced video format such as NTSC or PAL.

FIG. 1 represents an interlaced video format such as NTSC or PAL. A first field 100 includes even numbered scan lines 104, 106, 108, and 110. A second field 101 includes odd numbered scan lines 105, 107, 109 and 111. For a single video frame 103, field 100 is first scanned in direction 113 and displayed in its entirety. Then field 101 is scanned in direction 115 and displayed in its entirety. The combination of fields 100 and 101 makes up video frame 103 which includes scan lines 104–111. The process described above is then repeated for the next video frame 103.

Scan lines 104–111 are of course only representative of the hundreds of scan lines which make up a video frame. In a format such as NTSC, which has 525 scan lines per video frame 103, fields 100 and 101 have 262.5 scan lines each. For a format such as PAL or SECAM, which has 625 scan lines per video frame 103, each field 100 and 101 has 312.5 scan lines.

In contrast to standard television video, computer graphics typically use a noninterlaced format where all of the lines of a single video frame are scanned out sequentially. Consequently the term "field" is not applicable to noninterlaced computer graphics video.

Since in a noninterlaced format (in the computer graphics "domain") all of the scan lines making up a video frame are scanned out sequentially, a single frame of noninterlaced video contains twice the number of lines of either interlaced field 100 or 101. In order to display noninterlaced video on a television or record it on a VCR, fields must be derived from the noninterlaced frames and the data must be converted to an interlaced format such as NTSC, PAL, SECAM, digital composite, or digital component.

One relatively simple prior art method of converting noninterlaced video into interlaced video simply throws away every other scan line in each noninterlaced video frame to create a field. However, using this method, one-half of the vertical resolution for the resulting frame is discarded.

Figure 2:
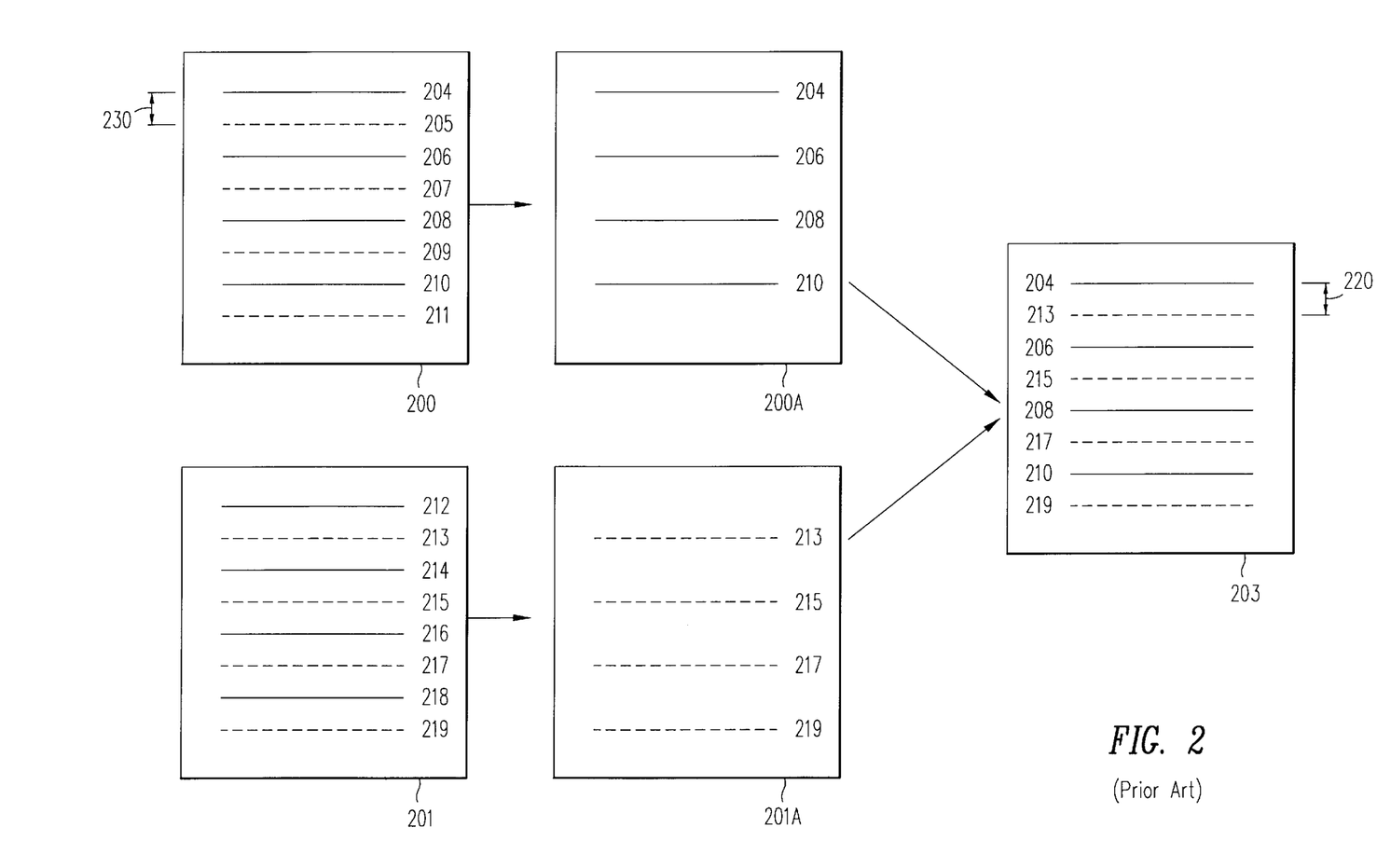
FIG. 2 shows one prior art method of converting noninterlaced video into interlaced video.

FIG. 2 shows another prior art conversion method. A noninterlaced video frame 200, including scan lines 204–211, is converted into a first interlaced field 200A including even scan lines 204, 206, 208 and 210. A second noninterlaced video frame 201 (which can be simply a second copy of noninterlaced video frame 200 from a buffer) including scan lines 212-219 is converted to a second interlaced field 201A including scan lines 213, 215, 217, and 219. Fields 200A and 201A are then scanned consecutively as discussed above. The result is interlaced video frame 203 which includes even scan lines 204, 206, 208 and 210 from noninterlaced video frame 200 and odd scan lines 213, 215, 217, and 219 from noninterlaced video frame 201.

The cost of implementing the two frame/two field method discussed above, and shown in FIG. 2, is minimal. However, an unfortunate side effect or artifact of this method is flickering. The flickering occurs because, as discussed above, in the computer graphics domain, the graphics or video data is typically displayed at a frame rate 70–80 noninterlaced frames per second, with approximately 65 microseconds between each scan line (see distance 230 in FIG. 2), while in the standard video domain, i.e., the NTSC, PAL, SECAM, or HDTV format, the video data is displayed at a frame rate of 30 (NTSC) or 25 (PAL and SECAM) interlaced frames per second with half the information, i.e. every odd line 213–219, being displayed for 16.67 milliseconds followed by the second half of the encoded video information, i.e., every even line 204–210, being displayed for 16.67 milliseconds. Consequently, a flicker is caused by a temporal discontinuity between the scan lines in the two formats. This problem is especially evident in motion video or graphics.

The effect of this temporal discontinuity is most evident when a scan line of the noninterlaced graphics video is of a dark luminance (Y) and an adjacent scan line is of a lighter luminance (Y), or vice-versa, i.e., when there is a large differential in the luminance between vertically adjacent pixels in the noninterlaced video. This large differential causes a flicker artifact oscillating at the field rate of the interlaced system (60 Hz for NTSC or 50 Hz for PAL or SECAM) and the larger the differential, the more visually noticeable the flicker.

There is a similar effect if one line of noninterlaced graphics data has a first value for one of the color components (U, I, V, Q, Cr, Cb, Pr, Pb, etc.) and a subsequent line has a second, different, value for one of these components, i.e., there is a large differential in one of the color components between vertically adjacent pixels. For example, in a checkerboard pattern of a first color and a second color, the resulting interlaced video frame will flicker first color, then second color, then first color, etc. at the field rate of 60 Hz (NTSC) or 50 Hz (PAL or SECAM). Consequently, there is an inherent potential for a flicker artifact for each video component whenever noninterlaced video is converted to an interlaced format by prior art methods.

Figure 3:
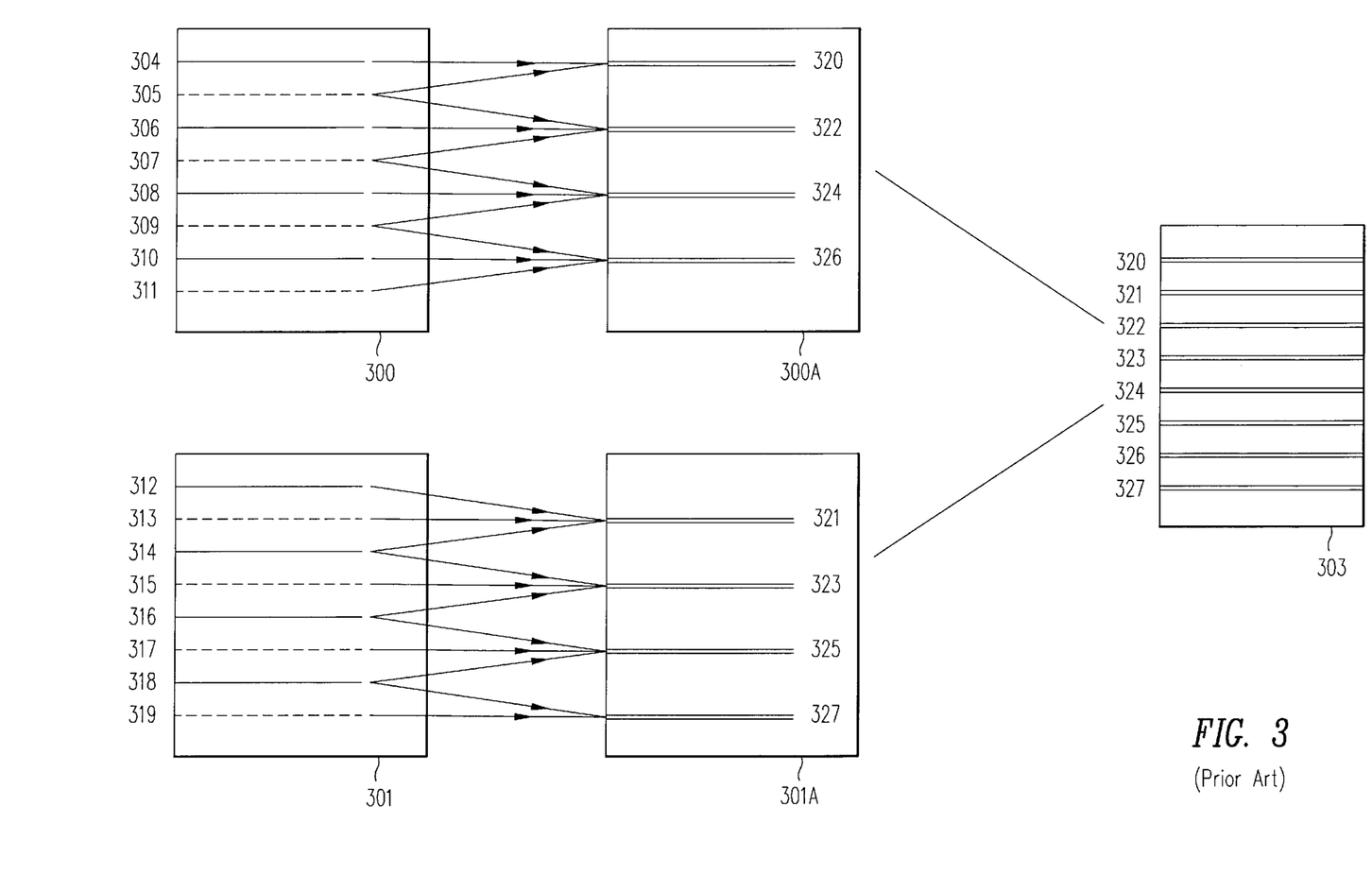
FIG. 3 shows a prior art line averaging or weighing method for eliminating the flicker artifact.

One prior art solution to the flicker artifact is to line average, or interpolate, two or more scan lines of noninterlaced video into one scan line of interlaced video. FIG. 3 shows a prior art method of reducing the flicker artifact where three scan lines of noninterlaced video are line averaged to generate one scan line of interlaced video. In FIG. 3, a first noninterlaced video frame 300 is converted to an interlaced field 300A by: line averaging or weighing noninterlaced scan lines 304 and 305 to create interlaced scan line 320; line averaging noninterlaced scan lines 305, 306 and 307 to create interlaced scan line 322; line averaging noninterlaced scan lines 307, 308 and 309 to create interlaced scan line 324; and line averaging noninterlaced scan lines 309, 310 and 311 to create interlaced scan line 326.

As also seen in FIG. 3, noninterlaced video frame 301 (which can be simply a copy of video frame 300) is converted to a second interlaced field 301A by a similar line averaging method offset by one line.

Using the conventional "line averaging" method shown in FIG. 3, interlaced fields 300A and 301A are then combined by the frame interlace process shown in FIG. 1 to create interlaced video frame 303 including averaged scan lines 320 through 327. Interlaced video frame 303 can then be processed for use with a conventional television monitor or recorded on a VCR.

Using the line averaging method of FIG. 3, the effect of the hard vertical edge transitions described above is minimized because any large differential in the luminance, or other color component, of vertically adjacent pixels are smoothed out over several averaged interlaced scan lines. Therefore, the line averaging method of FIG. 3 does eliminate some of the flicker artifact. However, this line averaging method has several drawbacks.

First, this line averaging method darkens the resulting video frame 303 and blurs image edges. The blurring occurs on edges separating a pixel of a first luminance (Y) value from a pixel of a second luminance (Y) value, e.g., a dark pixel/light pixel transition that is one pixel wide. Using the line averaging method of FIG. 3, the luminance (Y) of both pixels are averaged and the contrast is lost. Thus, in the extreme situation of a black pixel/white pixel transition, a gray colored pixel is produced and the black/white contrast is lost.

Second, as discussed above, line averaging is only needed when there is a significant difference in the luminance, or one of the other color components, associated with vertically adjacent pixels of the noninterlaced video. However, with prior art line averaging methods the line averaging is performed on every scan line of every frame, whether or not there is a significant difference in the luminance, or color components, of the two vertically adjacent pixels. Therefore, with the prior art methods, even in frames where averaging is unnecessary, and there is no real potential for flicker, blurring and darkening is introduced without any real benefit. Further, with prior art methods, no way of correcting or compensating for the blurring and darkening effects of line averaging is provided. Additionally, prior art systems are highly inefficient and costly in terms of memory (circuitry) used.

In addition, with the prior art line averaging methods, care must be taken at the beginning and end of each noninterlaced video frame 300 and 301 because fewer scan lines are available for averaging. This complicates implementation.

More sophisticated versions of the line averaging method shown in FIG. 3 perform five and seven line averaging. However, as the number of scan lines to be averaged increases, so does the amount of darkening and blurring. In addition since, in the prior art, each scan line is averaged, as the number of lines to be averaged increases, the cost of the implementation increases.

Finally, as discussed above, conventional methods of reducing the flicker artifact, such the method shown in FIG. 3, typically only address the flicker associated with the luminance (Y) component of the interlaced video. Therefore, the inherent flicker associated with the other color components (U, I, V, Q, Cr, Cb, Pr, Pv, etc.) is still present.

The present inventors have recognized that what is needed is a method for correcting the flicker artifact associated with noninterlaced to interlaced video conversion which substantially removes the flicker artifact from all the color components but is more selective than prior art methods and does not compromise the color purity, brightness, resolution, or sharpness of the resulting interlaced display. The method should also be relatively inexpensive to implement, and be user programmable.

SUMMARY

According to the invention, correction of the flicker artifact associated with noninterlaced to interlaced video conversion includes a Set Interpolative Threshold/comparator (SIT/comparator) function which allows e.g. the user to define a threshold value for the difference in luminance, or other component, between two or more vertically adjacent pixels. This threshold value is then compared with the actual difference in luminance, or other color component, between two or more vertically adjacent pixels in the noninterlaced video. If the actual differential value is less than the threshold value, then non-averaged video is used as the output video. If, on the other hand, the actual differential value is greater than or equal to the threshold value, then weighted line averaged video is used as the output video. Thus the SIT/comparator function discriminately applies such line averaging, based on user (or other) input, so that the negative effects of the line averaging are not introduced unless they are warranted by a sufficient potential for flickering.

In addition, in one embodiment of the invention, when weighted line averaged video is used, the negative (loss of contrast) effects of the line averaging are at least partially corrected using an aperture/inverse aperture correction function.

DETAILED DESCRIPTION

Figure 4:
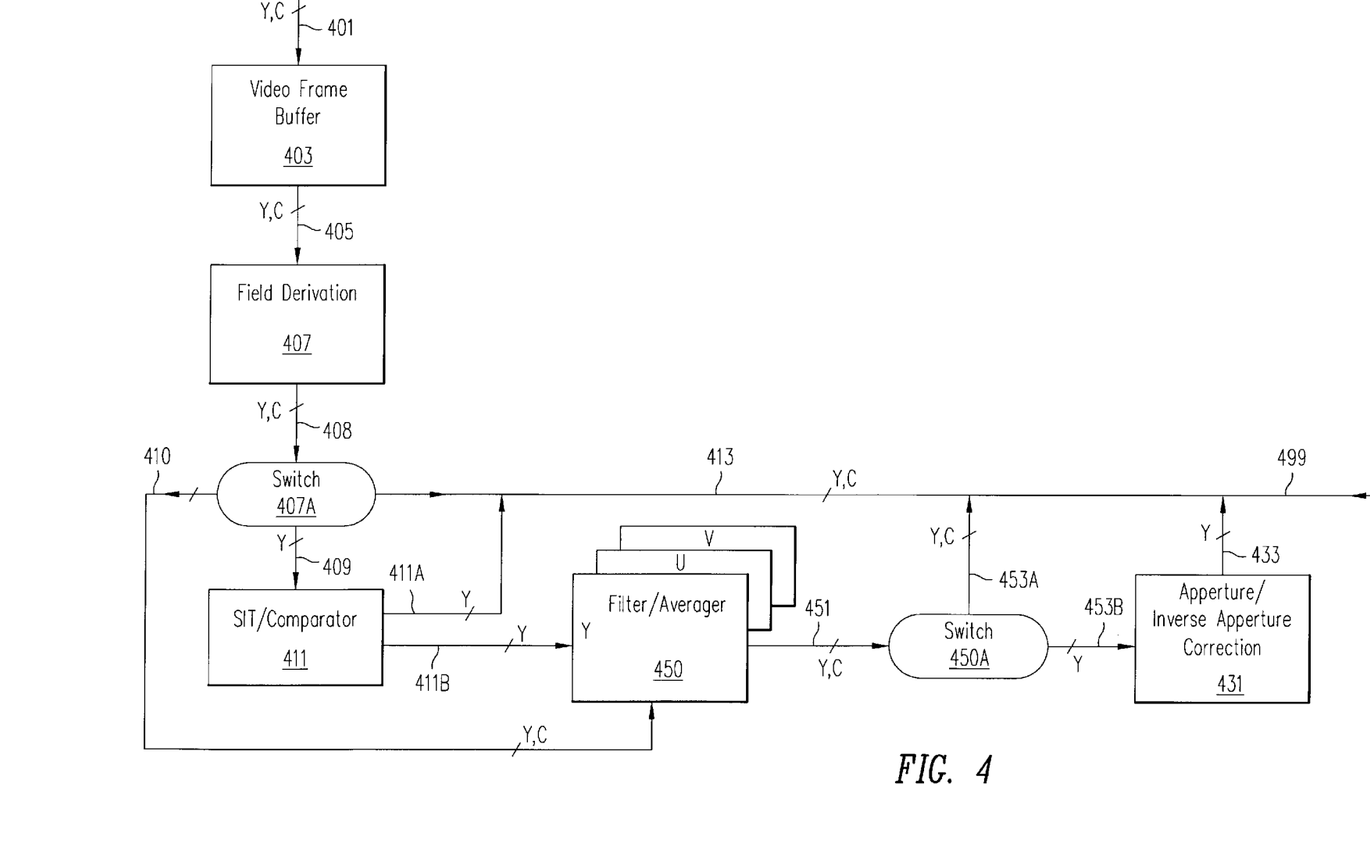
FIG. 4 shows a block diagram of one embodiment of the invention.

FIG. 4 shows a block diagram of one embodiment of the invention. Noninterlaced digitized video is provided from a source (not shown), such as a computer, into a conventional video frame buffer 403 via bus 401. In one embodiment of the invention, bus 401 is a 24 bit bus (8 bits for each of Y, U, V) but this is only illustrative and for instance there may be 10 bits for each of Y, U, V. It is to be understood that the sum of U and V is conventionally designated C (chrominance) as shown in FIG. 4. Further, FIG. 4 shows for each bus segment its width in terms of Y only (8 or 10 bits) or Y, C (24 or 30 bits). As discussed above, the noninterlaced video frame stored in video frame buffer 403 has twice the number of scan lines required for each field to be used in an interlaced video display. The noninterlaced video stored in frame buffer 403 is read out one pixel at a time, to field derivator 407, via bus 405.

Field derivator 407 converts the noninterlaced frame video into fields by one of several methods well known to those of skill in the art and discussed below. Further, FIG. 4 shows for each bus segment its width in terms of Y only (8 or 10 bits) or Y,C (24 or 30 bits). It is to be understood that the sum of U and V is conventionally designated C (chrominance) as shown in FIG. 4. The resulting video field data is then coupled to bus 408 and switch 407A. Switch 407A is set e.g. by the user via a user interface (not shown) to either disconnect the Set Interpolative Threshold (SIT) function or to connect the SIT function and couple the luminance of the raw video field data to bus 409 and SIT/comparator 411.

As discussed in more detail below, when connected by switch 407A, SIT/comparator 411 derives a differential value of the luminance (Y) component between vertically adjacent pixels in the raw video fields from field derivator 407 and compares the differential value with a threshold value set by the user via a user interface (not shown). SIT/Comparator 411 operates only on the luminance component. If the differential value is less than or equal to the threshold value, then the raw field data is coupled, via bus 411A, to bus 413 and output terminal 499. (Output terminal 499 is connected to a conventional video digital to analog converter and then e.g. to a TV monitor.)

If however, the differential luminance value of vertically adjacent pixels is greater than or equal to the threshold value, SIT/comparator 411 outputs the raw Y video field data to filter/averager 450 via bus 411B. Filter/averager 450 then averages the luminance (Y) and also each of the other color components (U, I, V, Cr, Cb, Pr, Pb, etc.) of the raw video data by one of several methods discussed in more detail below. The other video components are coupled directly to filter/averager 450 via bus 410. Filter/averager 450 hence is shown as operating on each of the Y, U, V components. The averaged video from filter/averager 450 is then coupled to switch 450A via bus 451.

Switch 450A is set e.g. by the user via the user interface (not shown) to either connect or disconnect an aperture/inverse aperture correction feature performed by aperture/inverse aperture corrector 431. When aperture/inverse aperture correction is not selected, switch 450A couples the averaged video from filter/averager 450 to bus 413, via bus 453A, and output terminal 499. When aperture/inverse aperture correction is selected, switch 450A couples the luminance component (Y) of the averaged video data to aperture/inverse aperture corrector 431 via bus 453B. Again, corrector 431 operates only on the luminance component.

As discussed in more detail below, aperture/inverse aperture corrector 431 includes a series of comparators and registers, which, in one embodiment of the invention, performs either aperture correction or inverse aperture correction on the luminance value (Y) of the averaged video data. Aperture correction increases the amplitude of high amplitude video signals by adding (digital) values to them and decreasing the amplitude of low amplitude video signals by subtracting (digital) values to create a larger video contrast, i.e., to counterbalance the blurring effect discussed above. In its simplest form, aperture correction makes whites whiter and blacks blacker.

On the other hand, inverse aperture correction involves lowering the amplitude of high amplitude signals by subtracting (digital) values, and increasing the amplitude of low amplitude signals, by adding (digital) values. Inverse aperture correction compensates for the darkening effect discussed above. The choice of whether to use aperture or inverse aperture correction is, in one embodiment of the invention, made by the user via the user interface (not shown) based on the type of video to be displayed, i.e., graphics, text, or video based on the needs of the user and his preferences.

In an embodiment of the invention including aperture/inverse aperture corrector 431, after the luminance (Y) component of the averaged video from filter/averager 450 has been processed by aperture/inverse aperture corrector 431, the averaged and corrected video is coupled, via bus 433, to bus 413, and output terminal 499.

The method of correcting the flicker artifact associated with noninterlaced to interlaced conversion shown in FIG. 4 provides for six different video data paths, each involving different levels of video processing. A first data path is established when SIT/comparator 411, filter/averager 450, bus 410, and aperture/inverse aperture corrector 431 are disabled by switches 407A and 450A. Under these conditions, raw field video from the video frame buffer 403 is coupled to field derivator 407 which simply converts the noninterlaced frames of video into fields by separating the frame video into odd and even lines and storing the odd and even lines in separate registers. The raw field video is then coupled to switch 407A via bus 408 which, in turn, couples the raw field video to bus 413 and output terminal 499.

The second data path is established when SIT/comparator 411 is disabled by switch 407A, filter/averager 450 is enabled by switch 407A, and aperture inverse aperture corrector 431 is disabled by switch 450A. Under these conditions, the fields from derivator 407 are coupled directly to bus 410 and filter/averager 450 by switch 407A. Filter/averager 450 then couples the averaged video to bus 451 and switch 450A which couples the averaged video to bus 413, via bus 453A, and output terminal 499. This second path is roughly the equivalent of the prior art averaging methods discussed above which average all lines of video regardless of necessity or the probability of flicker.

A third data path is established when SIT/comparator 411 is enabled by switch 407A and SIT/comparator 411 determines, by methods discussed in more detail below, that averaging is not required. Under these conditions, the unfiltered/unaveraged video is coupled from SIT/comparator 411 to bus 411A, bus 413, and output terminal 499.

A fourth data path is established when SIT/comparator 411 is enabled by switch 407A, aperture/inverse aperture corrector 431 is disabled by switch 450A, and SIT/comparator 411 determines that there is a probability of flicker sufficient to justify filtering/averaging. Under these conditions, the video is coupled from SIT/comparator 411 to bus 411B and filter/averager 450 which performs the filtering/averaging. Filter/averager 450 then couples the averaged video to bus 451 and switch 450A couples the averaged video to bus 413, via bus 453A, and output terminal 499.

A fifth data path is established when SIT/comparator 411 is disabled by switch 407A, bus 410 is enabled by switch 407A and aperture/inverse aperture corrector 431 is enabled by switch 450A. Under these conditions, the video field data from field derivator 407 is averaged by filter/averager 450 and then the effects of the averaging are reduced by aperture/inverse aperture corrector 431. The averaged and processed video is then coupled to bus 413 and output terminal 499 by bus 433.

A sixth data path is established when SIT/comparator 411 is enabled by switch 407A, aperture/inverse aperture corrector 431 is enabled by switch 450A, and SIT/comparator 411 determines that there is a probability of flicker sufficient to justify filtering/averaging. Under these conditions, the averaged video on bus 451 from filter/averager 450 is coupled by switch 450A to aperture/inverse aperture corrector 431. The averaged and corrected video is then coupled, via bus 433, to bus 413 and output terminal 499.

Thereby SIT/comparator 411 makes it possible to correct the flicker artifact associated with noninterlaced to interlaced video conversion more efficiently and effectively than prior art methods which simply average every adjacent scan line. This is because SIT/comparator 411 incorporates an e.g. user defined threshold value to determine whether or not to employ line averaging. Therefore, line averaging is only used where necessary, i.e., when the positive effects of eliminating flicker outweigh the negative effects introduced by line averaging.

Further, when aperture/inverse aperture correction is selected, aperture/inverse aperture corrector 431 reduces the blurring and darkening effects introduced by the filtering/averaging process.

Figure 5:
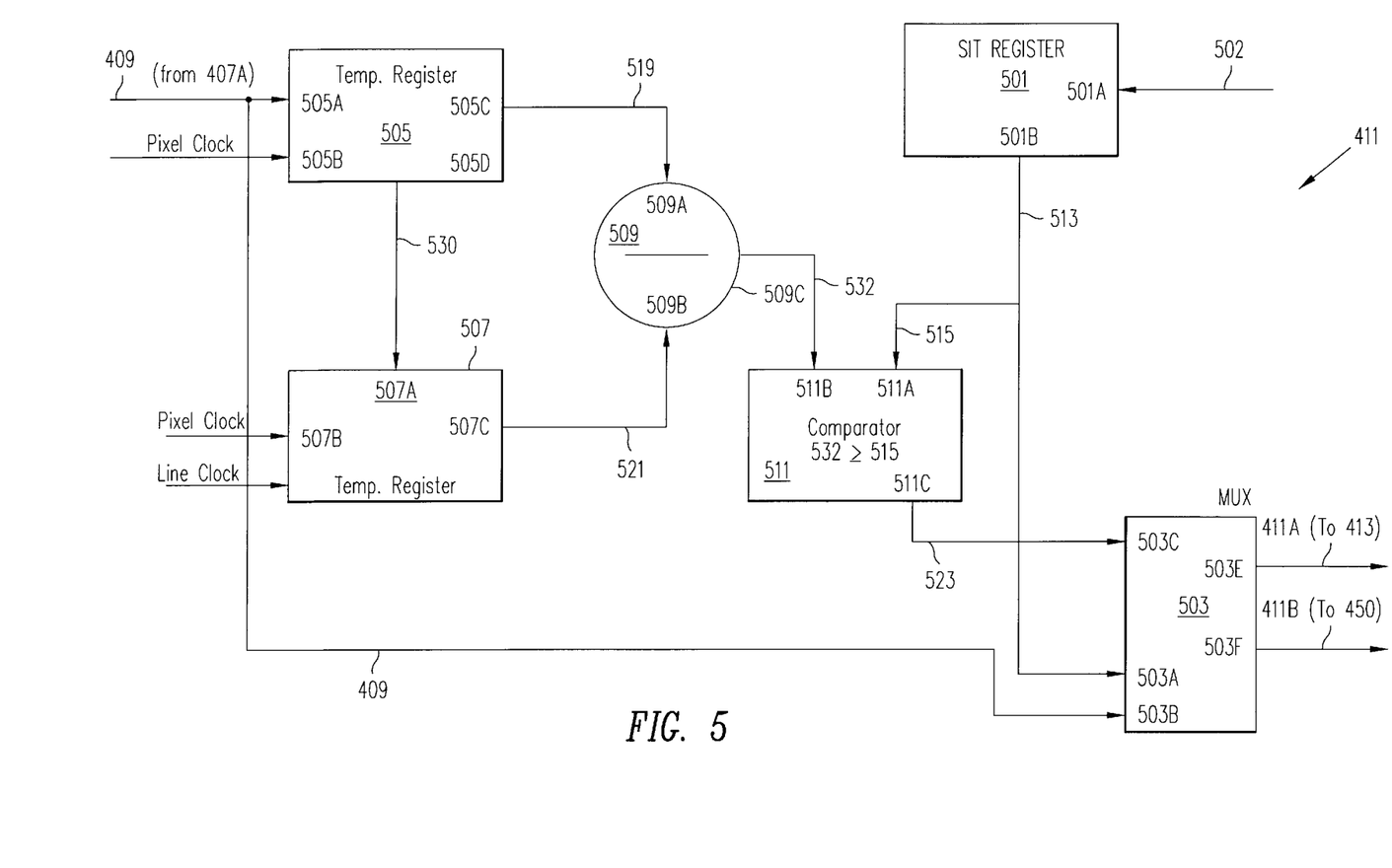
FIG. 5 shows one embodiment of the Set Interpolative Threshold (SIT)/comparator of FIG. 4.

FIG. 5 shows one embodiment of a Set Interpolative Threshold (SIT)/comparator 411 which includes SIT threshold register 501, multiplexer 503, first line temporary register 505, second line temporary register 507, subtractor 509, and comparator 511. SIT/comparator 411 is e.g. an 8 bit or 10 bit bus device, operating on luminance only. The various lines in FIG. 5 carrying video signals hence each represent e.g. an 8 or 10 line bus as appropriate.

SIT register 501 includes input terminal 501A which is coupled via user interface line 502 to an operator interface (e.g. software, not shown). Line 502 provides an input to SIT/comparator 411 whereby a user can interface with SIT/comparator 411, via any standard interface means, to activate or deactivate the SIT/comparator function as well as define a threshold value which SIT comparator 411 uses to determine whether or not line averaging of the incoming video is required. The threshold value is e.g. set by the user and may be variable and depends on several factors such as the display medium used or the type of incoming video, i.e., graphics or text.

An activate signal on line 502 is coupled from input terminal 501A of SIT register 501 to output terminal 501B, line 513, and input terminal 503A of multiplexer 503. The signal representing the threshold value is coupled from output terminal 501B of SIT register 501 to input terminal 511A of comparator 511 via bus 515. The threshold value is stored in a register (not shown) of comparator 511 to be compared with a deferential value determined by a process discussed in more detail below.

Bus 409, which carries the field video from field derivator 407 (see FIG. 4), is coupled to input terminal 505A of first line temporary register 505. First line temporary register 505 stores the first scan line, and all subsequent odd scan lines, from the nonaveraged, noninterlaced video frame in field derivator 407. The second scan line, and all subsequent even scan lines, from field derivator 407 are coupled to input terminal 507A of second line temporary register 507 via output terminal 505D of first line temporary register 505 and bus 530.

First line temporary register 505 and second line temporary register 507 include pixel clock input terminals 505B and 507B respectively. The clock signals on input terminals 505B and 507B divide the scan lines in first line temporary register 505 and second line temporary register 507 into individual pixels. Register 507 is also timed by a line clock signal for each video scan line. These individual pixels are then coupled to output terminals 505C and 507C of first line temporary register 505 and second line temporary register 507, respectively. Consequently, the signal at output terminal 505C represents a first pixel while the signal at output terminal 507C represents a vertically adjacent pixel. The two vertically adjacent pixels at output terminals 505C and 507C are then coupled, via buses 519 and 521, respectively, to input terminals 509A and 509B of subtractor 509.

Subtractor 509 subtracts the luminance, or other color component, value of the pixel at input terminal 509B from the luminance, or other color component value, of the pixel at input terminal 509A. Subtractor 509 then generates a difference or differential signal at output terminal 509C. Other structures such as a comparator with appropriate logic may be substituted for subtractor 509.

The differential signal at output terminal 509C is coupled to input terminal 511B of comparator 511 via bus 532. Comparator 511 then compares the value of the differential signal at input terminal 511B with the threshold value at terminal 511A. If the value of the differential signal at terminal 511B is greater than or equal to the threshold value at terminal 511A, comparator 511 generates a signal of a first state at output terminal 511C which is coupled to multiplexer input terminal 503C via line 523. If the value of the differential signal at input terminal 511B is less than the threshold value at input terminal 511A, comparator 511 generates a signal of a second, different, state at output terminal 511C which is coupled to input terminal 503C of multiplexer 503 via line 523. In one embodiment of the invention, the signal of the first state generated by comparator 511 is a digital signal that is either high or low, and the signal of the second state generated by comparator 511 is a digital signal that is the opposite of the signal of the first state, i.e., low or high.

Multiplexer 503 also includes input terminal 503B which is coupled to bus 409, from switch 407A and field derivator 407 (see FIG. 4). As discussed above, the video on bus 409 is the non-averaged video from field derivator 407. Based on the combination of signals received at input terminals 503A and 503C, multiplexer 503 either couples the non-averaged video on bus 409 to bus 411A and output bus 413 or to bus 411B and filter/averager 450 (see FIG. 4).

As discussed above, a signal in a first state on input terminal 503A of multiplexer 503 indicates that the user has deactivated the SIT/comparator function. When the SIT/comparator function is disabled, averaged video on bus 409 is fed directly though input terminal 503B of multiplexer 503 to output terminal 503E, bus 411A, bus 413, and output terminal 499 (see FIG. 4) to be displayed.

However, when the signal at input terminal 503A is a signal of a second state, i.e., the filter/averager function is activated, the video signal is coupled to output terminal 505F of multiplexer 503 and filter/averager 450 via bus 411B.

However, when the SIT/comparator function is activated, i.e., the signal at input terminal 503A is in a second state and the filter/averager function is activated, and the differential signal at input terminal 511B of comparator 511 has a value less than the threshold value at input terminal 511A, the signal on input terminal 503C of multiplexer 503 is a signal of a second state and the non-averaged video on bus 409 is coupled from input terminal 503B of multiplexer 503 to output terminal 503E, bus 413, and output terminal 499. In this instance SIT/comparator 411 has determined, based e.g. on the user defined threshold value, that the difference in the luminance, or other color component value, of the two vertically adjacent pixels of the non-averaged video field is not great enough to present a flicker problem. Therefore, introducing the blurring and darkening associated with line averaging is not justified and the non-averaged video on bus 423 is used.

If, on the other hand, the differential signal at input terminal 511B of comparator 511 has a value greater than the threshold value at input terminal 511A, the signal on input terminal 503C of multiplexer 503 is a signal in a first state and the averaged video on bus 409 from frame derivator 407 is coupled from input terminal 503C of multiplexer 503 to bus 411B and filter/averager 450. Thus, in this instance, SIT/comparator 411 has determined, based on the user defined threshold value, that the difference in the luminance, or other color component values, of the two vertically adjacent pixels of the non-averaged video field does present a potential flicker problem and therefore the video on line 409 is averaged and filtered.

Although the SIT/comparator discussed above has a single input channel or bus 409 for luminance, in one embodiment of the invention a separate channel is provided for the luminance (Y) and each color component (U, I, V, Cr, Cb, Pr, Pv, etc.). Thus, in this embodiment of the invention, the number of channels will typically be three.

SIT/comparator 411 ensures that averaged video is used only when there is a sharp edge transition in luminance, or other color component in the non-averaged field video which presents a potential flicker problem. When there is no danger of a flicker artifact, i.e., when there is no large difference between the luminance and/or color components of two vertically adjacent pixels, then averaging is not performed and the adverse blurring and darkening effects are not introduced.

Various embodiments of a digital filter/averager 450 can be used according to the principals of the invention depending on the type of averaging and/or interpolation desired by the user. For instance, filter averager 450 can be designed to perform two line averaging, three line averaging, five line averaging, or even seven line averaging, depending on the needs of the user. Further, filter/averager 450 can be designed to give different weighing values to each scan line of the noninterlaced video to be interpolated. The number of lines to be averaged and/or interpolated, and the value of the weighing function, are all determined by the user based on the ultimate cost of the system to be designed, the quality of the resulting video required, the type of computer video input, i.e., text or graphics, and any one of a number of other possible variables well known to those of skill in the art.

Figure 6:
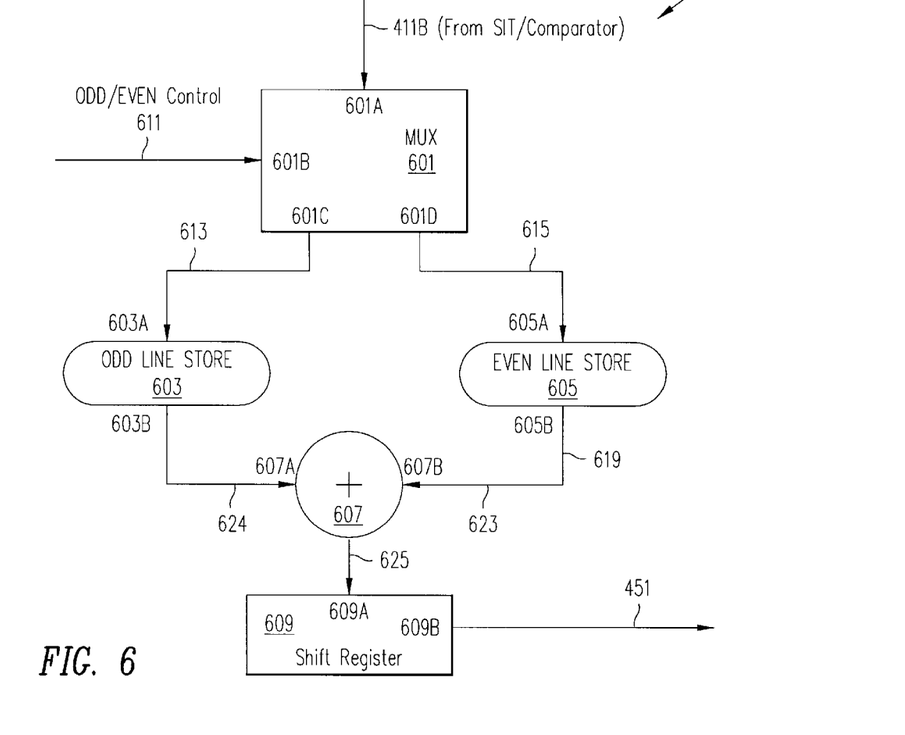
FIG. 6 shows one embodiment of the field derivator of FIG. 4.

FIG. 6 shows one embodiment of a filter/averager 450 which performs two line averaging with a weighing factor of 50% per averaged line. The embodiment of filter/averager 450 shown in FIG. 6 includes multiplexer 601, odd line storage register 603, even line storage register 605, adder 607 and shift register 609. Video from SIT/comparator 411 (see FIG. 4) is coupled via bus 411B to input terminal 601A of multiplexer 601 (see FIG. 6). An odd/even control signal is coupled via line 611 to input terminal 601B of multiplexer 601. The odd/even control signal on line 611 serves to clock the incoming video from SIT/comparator 411 such that the video is divided into odd and even lines. Once the raw video from SIT/comparator 411 is divided into odd and even scan lines, the odd scan lines are coupled from multiplexer 601 output terminal 601C to bus 613 and input terminal 603A of odd line storage register 603. The even scan lines are coupled from output terminal 601D of multiplexer 601 to bus 615 and input terminal 605A of even line storage register 605. The video signal at output terminal 603B of odd line storage register 603 is coupled to input terminal 607A of adder 607, via bus 624, and the video from even line storage register 605 is coupled from output terminal 605B to input terminal 607B of adder 607 via bus 623. Adder 607 then adds the two signals at 607A and 607B and generates a signal representing the sum of these two signals to output terminal 607C and bus 625 which is coupled to input terminal 609A of shift register divide by two 609.

Shift register 609 takes the summation signal from adder 607 and divides it by two, thereby yielding a signal at output terminal 609B which represents the evenly weighted average of odd scan lines and even scan lines from register 603 and 605, respectively. The line averaged video at output terminal 609B of shift register 609 is then coupled to bus 451 which is, in turn, coupled to switch 450A.

In another embodiment of the invention, filter/averager 450 is designed to perform three line averaging. In one embodiment of the invention, three line averaging is performed with variable weighing factors. For instance, referring to FIG. 3, in one embodiment of the invention, to create average scan line 322 of field 300A, the weighing factors given to lines 305, 306, and 307 are 25/50/25. That is to say 25% of the resulting video information comes from line 305, 50% of the information comes from line 306 and 25% of the information comes from line 307. It has been found empirically that this particular breakdown of weighing averages yields the best results. Methods for introducing weighing factors are well known to those of skill in the art. Therefore, a detailed description is omitted here to avoid distracting from the method of the invention.

In a third embodiment of a filter/averager 450, 5 line averaging is performed. In this embodiment of filter/averager 450, the weighing factors given to the various lines using the 5 line averaging approach is variable. For instance, in one embodiment of the invention, it is desirable to use the weighing factors 8/17/50/17/8, meaning that of the five lines averaged, the first line contributes 8% of the value, the second line contributes 17% of the value, the line of interest contributes 50% of the value, the fourth line contributes 17% of the value, and the fifth line contributes 8% of the value.

However, it has been found empirically that a weighing factor of 5/20/50/20/5 provides the best results.

Figure 7:
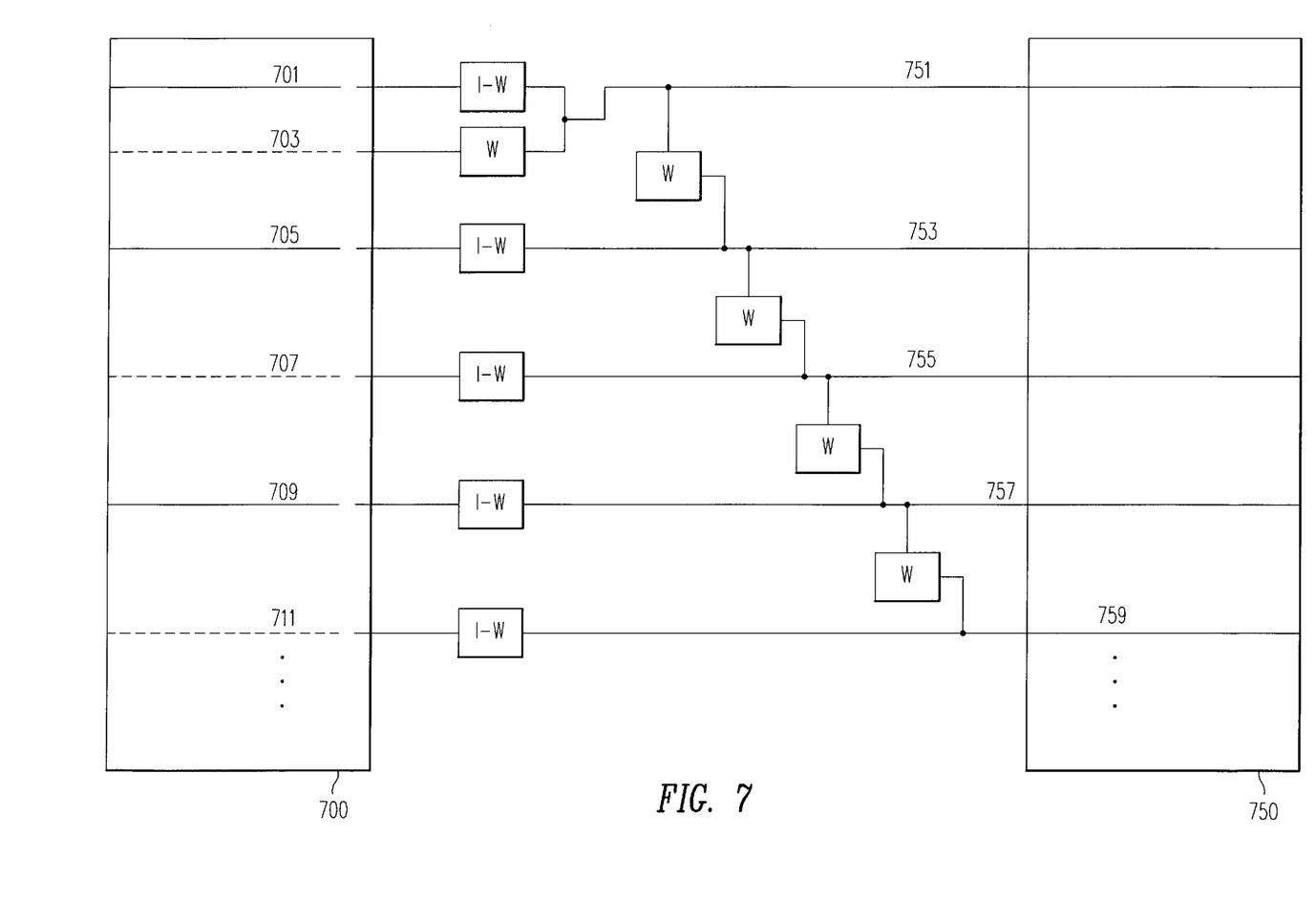
FIG. 7 is a graphical representation of resultant or convolution averaging according to the invention.

In addition to the averaging methods discussed above, a novel type of line interpolation can be employed with the present invention and is called herein "resultant averaging" or "convolution averaging". FIG. 7 is a graphical representation of this resultant or convolution averaging. In this resultant averaging, weighting factor W is selected by the user depending on system requirements. Weighting factor W is less than one and is typically less than 0.5. After weighting factor W is selected, a second weighting factor equal to 1-W is calculated. The two weighting factors are then used to convert non-averaged video field 700 into averaged video field 750 as follows. Scan lines here designated 701 and 703 are averaged on a weighted basis using W and 1-W, and the resultant averaged scan line 751 is produced. Averaged scan line 751 is then weighted by weighting factor W and combined with a scan line here designated 705 which is weighted by weighting factor 1-W. Weighted scan lines 751 and 705 are then combined and become scan line 753. Averaged scan line 753 has weighting factor W applied and weighting factor 1-W is applied to scan line 707. Weighted scan lines 753 and 707 are then combined to yield averaged scan line 755. Weighting factor W is then applied to averaged scan line 755 and weighting factor 1-W is applied to scan line 709. The weighted scan lines 709 and 755 are then combined to yield averaged scan line 757. Weighting factor W is then applied to scan line 757 and weighting factor 1-W is applied to scan line 711. Weighted scan line 711 and 757 are then combined to yield averaged scan line 759. This process continues (not shown) for all of the scan lines of field 700 until interlaced field 750 is completed. Use of the weighting factors W and 1-W in this resultant averaging process allows e.g. the user to vary the weighting factors and each new interlaced scan line 751, 753, 755, 757 and 759 reflects a weighted result history of the averaging process taking place in the preceding scan line. As a result the transitions between interlaced scan lines 751 et al. in interlaced frame 750 are smoother and introduce less blurring and darkening.

Figure 8:
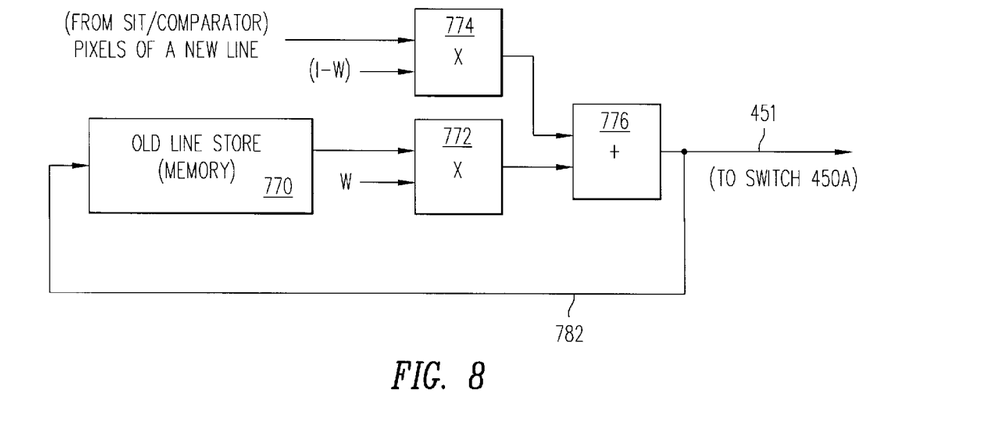
FIG. 8 is a block diagram of a convolution averager according to the invention.

FIG. 8 is a block diagram of a resultant averager to perform the function shown in FIG. 7. Line memory 770 stores (in digital form) the Y, U, V pixel values for an old (previous) line. These values are supplied, on a pixel-by-pixel basis, to multiplier 772 which multiplies the component values by e.g. user-supplied weighting factor W, to produce a product which is input to adder 776. The pixels of the next (new) video line are then applied to multiplexer 774, the second input to which is the second weighting factor 1-W. The resulting product is added by adder 776 to the product from multiplier 772. The output weighted scan line is supplied on bus 451 to switch 450A, and also is fed back on line (lines) 782 to the old line memory 770.

The method used to perform the line averaging in filter/averager 450 depends on e.g. user needs. However, whichever averaging method is employed, the averaged video is coupled to bus 451 (see FIG. 4) and to switch 450A. Switch 450A is set by the user to determine whether the averaged video is coupled by bus 453A to bus 413 and output terminal 499 or by bus 453B to aperture/inverse aperture corrector 431 for further processing.

As discussed above, aperture correction adds digital values to e.g. the luminance component of video signals having above the value set by a high threshold register, and subtracting digital values from video signals having luminant values below the value set by a low threshold register.

Figure 9:
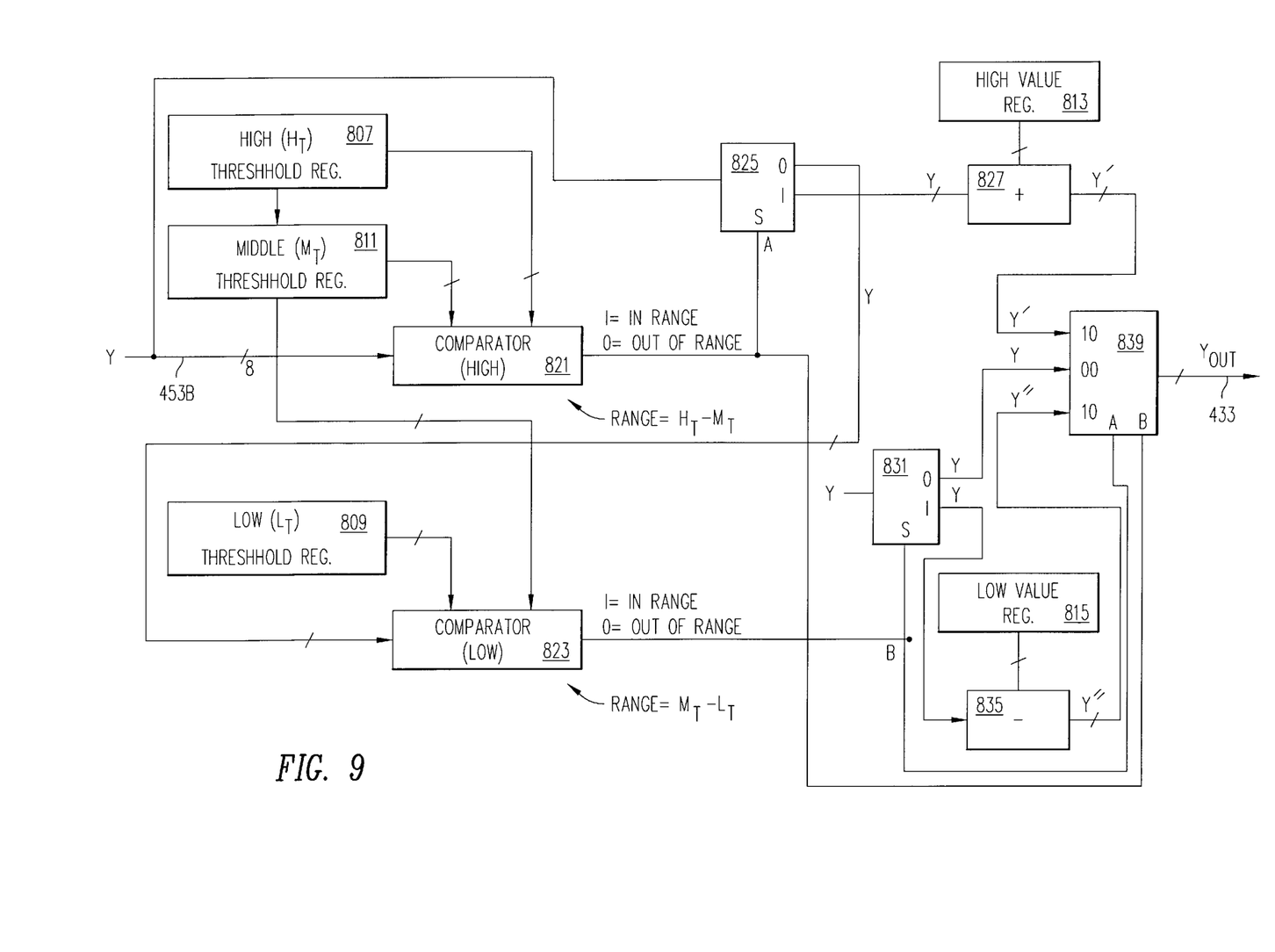
FIG. 9 shows one embodiment of an aperture/inverse aperture corrector according to the invention.

FIG. 9 shows one embodiment of an aperture/inverse aperture corrector 431 of FIG. 4. In FIG. 9, high, middle, and low threshold values $H_T$, $M_T$, and $L_T$ are loaded via the user interface into respectively registers 807, 811 and 809, thereby defining four ranges of luminance values. A high threshold adjustment value, typically a digital value e.g. the range of 1 to 16 (but not so limited), which is to be added to the luminance component of an input video signal, is loaded into high aperture correction register 813; a low threshold adjustment value, also e.g. a digital value in the range of 1 to 16, which is to be subtracted from the luminance component of the input video signal, is loaded into low aperture correction register 815. It is to be understood that FIG. 9 shows structure aperture correction; inverse aperture correction is performed by a separate slightly different structure as explained below. The values loaded into registers 807, 809, 811, 813 and 815 are all provided e.g. by the user interface.

The Y luminance value is supplied at 8 bit bus 453B from switch 450A of FIG. 4, and applied to comparators 821, 823. Comparator 821 determines if the Y value is between the high and middle thresholds. If so, the output of comparator 821 is a value 1; if no, it is 0. This output signal 0 or 1 (designated A) is applied to the select (S) terminal of demultiplexer 825. The data input terminal of demultiplexer 825 receives the signal Y. If signal A is 1, the signal Y is applied to adder 827, the other input terminal of which is connected to receive the high threshold adjustment value from register 813. The output sum signal from adder 827 is aperture corrected signal Y'.

If however signal A is 0, then the Y value is applied from demultiplexer 825 to the second (low range) comparator 823, there to be compared to the range between the middle and low threshold values. If Y is in this range, output signal B is 1; if outside the range, signal B is 0. Second demultiplexer 831 then, in accord with the applied value of signal B, supplies signal Y as an output signal or corrects signal Y by applying it to subtractor 835, the second input to which is the low threshold adjustment value from register 835, the output of which is aperture corrected signal Y".

Output multiplexer 839 receives signals Y, Y' and Y", and selects one of them depending on the value of the two bit control signal AB, to provide the corrected Y-out signal on bus 433.

The inverse aperture correction structure is identical to that of FIG. 9, except that adder 827 is a subtractor and subtractor 835 is an adder. Further, additional logic (under user control) determines if aperture correction or inverse aperture correction is to be used. This selection may be on a pixel-to-pixel basis. It has been found that various video frame types (text, graphics, video) benefit from different types of aperture and inverse aperture correction, which hence can be applied adaptively.

Hence in accordance with the invention, given a primary graphics stream and a video stream, one takes a cumulative total of the luminance over several pixels or several video lines. This value is then used adaptively to determine the use of aperture correction/inverse aperture correction to increase contrast.

After the line averaged video from filter/averager 450 has been processed by aperture/inverse aperture corrector 431 as discussed above, the line averaged and processed video is coupled to bus 433, bus 413 and output terminal 499. The resulting line averaged video as displayed has significantly less blurring and darkening than video which has been averaged and no aperture and inverse aperture corrected. This is because, as discussed above, aperture correction and inverse aperture correction reintroduce some of the contrast lost in averaging and eliminate some of the darkening.

The present system is advantageous over the prior art in several ways. First, SIT comparator 411 (see FIG. 5) allows the user to control the system to determine exactly the threshold value generated by SIT register 501. This allows the user to determine how great a difference in the luminance, or other color component value, is necessary to warrant the introduction of the blurring and darkening effects associated with line averaged video. SIT/comparator 411 then averages video discriminately, based on the threshold value to prevent the blurring and darkening associated with line averaging from being introduced unless the potential for flicker is great enough to warrant these negative effects.

In addition, with aperture/inverse aperture corrector 431, even when line averaging is introduced to prevent the flicker artifact, the attendant negative effects are significantly diminished.

Although the present invention has been described with reference to particular embodiments, the description is only an example of the invention's application and should not be taken as a limitation. For instance, the above description is expressed in terms of circuitry. However, each circuit element may be replaced by equivalent software executed by a computer, and still fall within the scope of the invention. Writing such software is within the skill of one of ordinary skill in the art, given this disclosure. In particular, even though much of the preceding discussion is of embodiments of the invention, various other adaptations and combinations of the features of the disclosed embodiments are within the scope of the present invention as defined by the following claims.

We claim:

1. A noninterlaced video to interlaced video converter comprising:

a video frame buffer, said video frame buffer having an input terminal and an output terminal, said input terminal of said video frame buffer being coupled to a video source;

a video field derivator, said field derivator having an input terminal and an output terminal, said input terminal of said field derivator being coupled to said output terminal of said video frame buffer;

a first switch, said first switch having an input terminal coupled to said output terminal of said video field derivator, said first switch having a first, second, and third output terminal;

a SIT/comparator, said SIT/comparator having an input terminal coupled to said first output terminal of said first switch and first and second output terminals;

a filter/averager, a first input of said filter averager being coupled to said second output of said first switch, a second input of said filter averager being coupled to said second output of said SIT/comparator;

an output bus, said output bus being coupled to said first output terminal of said first switch, said first output terminal of said SIT/comparator also being coupled to said output bus, wherein when said first switch is in a first state, video from said field derivator is coupled to said filter averager;

when said first switch is in a second state, video from said field derivator is coupled to said SIT/ comparator; and when said first switch is in a third state, video from said field derivator is coupled to said output bus, further wherein:

when said first switch is in said second state, said SIT/comparator compares a luminance of vertically adjacent pixels of said video from said field derivator to a pre-determined threshold value and if said differential value is less than said pre-determined threshold value, said SIT/comparator couples said video to said first output terminal of said SIT/comparator, and if said differential value is greater than said pre-determined threshold value, said SIT/comparator couples said video to said second output terminal of said SIT/ comparator.

2. The noninterlaced to interlaced converter of claim 1, further comprising:

a second switch, said second switch having a first input terminal and first and second output terminals, said input terminal of said second switch being coupled to an output terminal of said filter/averager, a first output terminal of said second switch being coupled to said output bus;

an aperture/inverse aperture corrector, said aperture/ inverse aperture corrector having an input terminal and an output terminal, said input terminal of said aperture/ inverse aperture corrector being coupled to said second output terminal of said second switch, said output terminal of said aperture/inverse aperture corrector being coupled to said output bus, wherein when said second switch is in a first state, video from said filter/averager is coupled to said output bus, and when said second switch is in a second state, video from said filter/averager is coupled to said aperture/ inverse aperture corrector; and an output terminal of said noninterlaced to interlaced converter, said output terminal being coupled to said output bus.

3. The noninterlaced to interlaced converter of claim 1, wherein said SIT/comparator further comprises first and second registers, an output terminal of the first register being connected to a comparator and to an input terminal of the second register, and an output terminal of the second register being connected to the comparator.

4. The noninterlaced to interlaced converter of claim 1, wherein said filter/averager performs two line averaging.

5. The noninterlaced to interlaced converter of claim 1, wherein said filter/averager performs three line averaging.

6. The noninterlaced to interlaced converter of claim 1, wherein said filter/averager performs five or more line averaging.

7. The noninterlaced to interlaced converter of claim 1, wherein said filter/averager performs convolution averaging.

8. The noninterlaced to interlaced converter of claim 2, wherein said aperture/inverse aperture corrector further comprises a plurality of threshold registers each holding a threshold value, and at least two threshold adjustment registers, each holding an adjustment value to be applied to said video.

9. The noninterlaced to interlaced converter of claim 8, further comprising means for adaptively controlling the corrector dependent on a type of a current video frame.

10. A noninterlaced video to interlaced video converter comprising:

a video frame buffer, said video frame buffer having an input terminal and an output terminal, said input terminal of said video frame buffer being coupled to a video source;

a video field derivator, said field derivator having an input terminal and an output terminal, said input terminal of said field derivator being coupled to said output terminal of said video frame buffer;

a first switch, said first switch having an input terminal coupled to said output terminal of said video field derivator, said first switch having a first, second, and third output terminal;

a comparator, said comparator having an input terminal coupled to said first output terminal of said first switch and having first and second output terminals;

a filter/averager, a first input terminal of said filter averager being coupled to said second output terminal of said first switch, a second input terminal of said filter averager being coupled to said second output terminal of said comparator;

an output bus, said output bus being coupled to said first output terminal of said first switch, said first output terminal of said comparator also being coupled to said output bus, wherein when said first switch is in a first state, video from said field derivator is coupled to said filter averager;

when said first switch is in a second state, video from said field derivator is coupled to said comparator; and when said first switch is in a third state, video from said field derivator is coupled to said output bus, further wherein:

when said first switch is in said second state, said comparator compares a luminance of vertically adjacent pixels of said video from said field derivator to a pre-determined threshold value and if said comparator couples said video to said first output terminal of said comparator, and if said differential value is greater than said pre-determined threshold value, said comparator couples said video to said second output terminal of said comparator.

* * * * *